United States Patent Office 2,890,201
Patented June 9, 1959

2,890,201

VINYL CHLORIDE RESINOUS COMPOSITIONS LIGHT-STABILIZED WITH A DIBENZOYL ALKYL PHENOL

William B. Hardy, Bound Brook, N.J., assignor to American Cyanamid Company, New York, N.Y., a corporation of Maine No Drawing. Original application April 22, 1955, Serial No. 503,356. Divided and this application July 30, 1958, Serial No. 751,830

2 Claims. (Cl. 260—45.95)

This invention relates to light-stable resinous compositions and to the process of preparing the same. Still further, this invention relates to light stabilized polyvinyl chloride resin compositions containing from about 0.01% to about 5% by weight of a compound having the general formula:

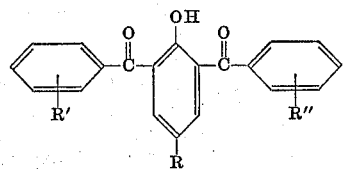

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen group.

This application is a division of my application Serial No. 503,356, filed April 22, 1955.

One of the objects of the present invention is to stabilize polyvinyl chloride resinous compositions from the deleterious effect of light and, more particularly, ultra-violet light by the incorporation therein of compounds having the general formula set forth hereinabove and described more fully in species hereinbelow. A further object of the present invention is to produce resinous compositions with markedly superior ultraviolet light adsorption characteristics. These and other objects of the present invention will be discussed in greater detail hereinbelow.

Plastic compositions based on polyvinyl chloride resins are well known in the art and have been employed extensively in the formation of molded, extruded and the like products. If in these plastic compositions are included dark pigments, such as maroon, black and the like, the effect of the sunlight or, more particularly, ultraviolet light on said fabricated products is virtually insignificant. However, if these plastic compositions are used without benefit of any coloring material where clear products are desired and if said fabricated products are to be subjected to the sun's rays, they tend to show oftentimes marked yellowing which, of course, renders such a product less desirable because of this color deterioration. I have discovered that by incorporating into these plastic compositions based on polyvinyl chloride, a small amount of a compound having the following general formula:

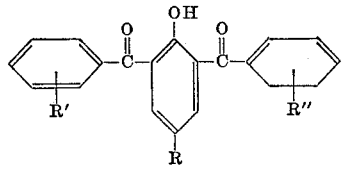

wherein R is an alkyl group containing from 1 to 10 carbon atoms, R' and R" are members selected from the group consisting of hydrogen, an alkyl group containing from 1 to 4 carbon atoms, alkoxy groups containing 1 to 4 carbon atoms, and a halogen group, I am able to inhibit the tendency of the resinous material to yellow when subjected to ultraviolet light.

The following examples, wherein parts are by weight, are illustrative of this invention and are not to be construed as limitative thereof.

EXAMPLE 1

100 parts of polyvinyl chloride, 50 parts di-2-ethyl hexyl phthalate and 2 parts of 2,6-dibenzoyl-4-methyl-phenol are blended together and fluxed on hot mill rolls at a temperature of about 130–150° C. for about 10–15 minutes. The resulting plasticized sheet was subjected to tests under the Fadometer. The first yellowing was observed after 638 hours. The test was continued for 1320 hours at which time the test was discontinued as the sheet had yellowed very markedly.

EXAMPLE 2

Example 1 is repeated in every detail except in the place of the 2,6-dibenzoyl-4-methylphenol, there is substituted an equal amount of a commercially available ultraviolet absorber. The first spot under the Fadometer appeared in less than 100 hours and the test was stopped because of marked yellowing after 154 hours.

EXAMPLE 3

Example 1 is repeated in every detail except that there is no ultraviolet light absorber added. The first spot appeared in less than 50 hours and the test was stopped after 88 hours because of the marked deterioration of the color of the sheet.

EXAMPLE 4

100 parts of polyvinyl chloride, 50 parts of di-2-ethyl hexyl phthalate, 4 parts of a heat stabilizer comprising a mixture of cadmium soaps of ricinoleic acid and hexanoic acid and 0.1 parts of 2,6-dibenzoyl-4-methylphenol are blended and fluxed on hot mill rolls for about 20 minutes at a mill temperature of about 130° C. In testing the plasticized sheet in the Fadometer, the first spot appeared in 132 hours, whereas the test was run for 528 hours before the sheet had deteriorated sufficiently to become substandard.

EXAMPLE 5

Example 4 is repeated in every detail except in the place of the 2,6-dibenzoyl-4-methylphenol, there is substituted an equal amount of a commercially available ultraviolet light absorber. When subjected to the Fadometer, the test was discontinued after 418 hours because the sheet had deteriorated sufficiently to become substandard.

EXAMPLE 6

Example 4 is repeated in every detail except that there is no ultraviolet light absorber added to the sheet. When subjected to the Fadometer, the test had to be stopped at 308 hours because the sheet had deteriorated sufficiently to become substandard.

EXAMPLE 7

Example 4 is repeated in every detail except that in the place of the 2,6-dibenzoyl-4-methylphenol, there is substituted an equal amount of 2,6-dibenzoyl-4-ethyl-phenol. The results of the Fadometer test were substantially the same as those realized in testing the sheet of Example 4.

In the Examples 4–7, inclusive, use was made of a heat stabilizer. These heat stabilizers are metallic soaps of fatty acids such as the metallic soaps of caproic, caprylic, lauric, myristic, palmitic, stearic, myristoleic, palmitoleic, oleic, linoleic, linolenic, elaestearic, ricinoleic acids and the like. Oftentimes, these metallic soaps are used in combination with one another. The metallic portion of the soap may be such metals as cadmium, lead, strontium, tin, barium and the like. The amount of heat stabilizer utilized is conventional and is well known in the art.

In order that the method for the preparation of these dibenzoyl alkyl phenols may be completely understood, the following example is set forth in which all parts are parts by weight, unless otherwise indicated.

*Preparation of 2,6-dibenzoyl-4-methylphenol*

Into a suitable reaction chamber equipped with thermometer and stirrer, there is introduced 15 parts of aluminum chloride and 120 parts of nitrobenzene. The charge is thoroughly mixed and while cooling, there is added 10.6 parts of 2-hydroxy-5-methyl-benzophenone. The cooling of the charge is discontinued permitting the temperature to return to room temperature, whereupon 9.75 parts of benzotrichloride are added and the mixture is then heated to about 70° C. and held at about that temperature for a 2 hour period. The reaction mixture is a purplish-black color. It is poured onto ice and allowed to stand overnight. The nitrobenzene remaining is removed by steam distillation. The aqueous layer is removed leaving a red tar residue which is dispersed in 400 parts is boiling 95% ethanol. The solution is treated with activated charcoal and filtered hot. On cooling, a fine yellow solid precipitate which is removed by filtration and is dried. 7.9 parts of the material is obtained. The product has a melting point of 160.2 to 163.2° C. The product is purified by recrystallization from a mixture of 80 parts of 95% ethanol and 62 parts of the product giving 6.1 parts of a material with a melting point of 164.2 to 165.6° C. Analysis calculated for $C_{21}H_{16}O_3$: C, 79.73; H, 5.10. Found: C, 79.58; H, 5.34.

Amongst the dibenzoyl alkyl phenols which may be used as ultraviolet light absorbers in keeping with the present invention are 2,6-dibenzoyl-4-methylphenol; 2,6-dibenzoyl-4-ethylphenol; 2,6-dibenzoyl-4-propylphenol; 2,6-dibenzoyl-4-butylphenol; 2,6-dibenzoyl-4-hexylphenol; 2,6-dibenzoyl-4-octylphenol; 2,6-dibenzoyl-4-decylphenol; 2,6-bis(p-methoxybenzoyl)-4-methylphenol; 2,6 - bis(p-propoxybenzoyl)-4-methylphenol; 2,6 - bis(p-butoxybenzoyl)-4-methylphenol; 2,6 - (p - butoxybenzoyl)-4-amylphenol; 2,6-bis(p-butoxybenzoyl)-4-nonylphenol; 2,6-bis(o-methylbenzoyl)-4-methylphenol; 2,6 - bis(o-butylbenzoyl)-4-methylphenol; 2,6 - bis(o-butylbenzoyl)-4-ethylphenol; 2,6 - bis(m-chlorobenzoyl)-4-methylphenol; 2,6-bis(m-bromobenzoyl)-4-methylphenol and the like. In addition to the chloro, and bromo substituted benzoyl alkyl phenols, one may readily utilize the iodo and fluoro substituted benzoyl alkyl phenols. The amount of these dibenzoyl alkyl phenols which may be used in the resinous compositions of the present invention may vary between about 0.01 and 5% by weight based on the total weight of the polyvinyl chloride. Preferably, one may use between about 0.1 and 1.0% by weight of these compounds based on the total weight of said resin solids.

What is claimed is:

1. A composition of matter comprising polyvinyl chloride resin and 0.01%–5% by weight of a compound having the general formula:

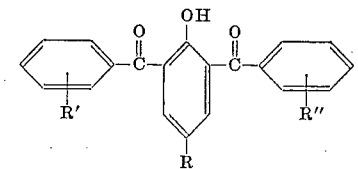

wherein R is an alkyl group containing from 1 to 10 carbon atoms, R′ and R″ are members selected from the group consisting of hydrogen, an alkyl group containing from 1 to 4 carbon atoms, alkoxy groups containing 1 to 4 carbon atoms, and a halogen atom.

2. A composition of matter comprising polyvinyl chloride resin and 0.01%–5% by weight of 2,6-dibenzoyl-4-methylphenol.

References Cited in the file of this patent

UNITED STATES PATENTS 2,434,496  Houtman _____ Jan. 13, 1948

OTHER REFERENCES

Newman et al.: J.O.C. 19, pp. 992–5 (1954).